United States Patent [19]
Hagemeyer

[11] Patent Number: 5,890,867
[45] Date of Patent: Apr. 6, 1999

[54] ROTATABLE FEEDGATE

[75] Inventor: Roland L. Hagemeyer, Rochelle, Ill.

[73] Assignee: The Louis Berkman Company, Steubenville, Ohio

[21] Appl. No.: 677,139

[22] Filed: Jul. 9, 1996

Related U.S. Application Data

[63] Continuation-in-part of Ser. No. 524,492, Sep. 7, 1995.

[51] Int. Cl.[6] ............................................. B60P 1/00
[52] U.S. Cl. ...................... 414/519; 414/502; 414/528; 222/556; 239/672; 239/676
[58] Field of Search ............................. 239/676, 664, 239/672; 222/290, 477, 481, 502, 508, 516, 537, 556, 548, 415; 414/502, 528, 414, 519, 520

[56] References Cited

U.S. PATENT DOCUMENTS

| | | |
|---|---|---|
| Re. 25,709 | 1/1965 | Swenson et al. .......................... 275/8 |
| 842,238 | 1/1907 | Parle ....................................... 239/676 |
| 947,538 | 1/1910 | Barrow . |
| 1,182,747 | 6/1916 | Brown . |
| 1,563,202 | 11/1925 | Lentz . |
| 1,735,930 | 11/1929 | Miller . |
| 1,746,410 | 2/1930 | Tolman, Jr. ............................ 222/556 |
| 1,909,238 | 5/1933 | Thompson . |
| 2,045,489 | 6/1936 | Payette . |
| 2,338,320 | 1/1944 | Donovan et al. . |
| 2,375,063 | 5/1945 | Andershock . |
| 2,484,325 | 10/1949 | Wachter ................................... 275/8 |
| 2,517,151 | 8/1950 | Weston . |
| 2,609,952 | 9/1952 | Balzer et al. . |
| 2,641,477 | 6/1953 | Davis et al. . |
| 2,658,795 | 11/1953 | Nicholson ............................... 292/17 |
| 2,774,602 | 12/1956 | Sanderson . |
| 2,805,863 | 9/1957 | Klostemann . |
| 2,870,923 | 1/1959 | Jewell, Jr. . |
| 2,967,056 | 1/1961 | D'Amato .................................. 275/8 |

(List continued on next page.)

FOREIGN PATENT DOCUMENTS

| | | | |
|---|---|---|---|
| 344563 | 11/1921 | Germany ............................ 222/556 |
| 967340 | 5/1981 | Russian Federation . |
| 1184453 | 10/1985 | U.S.S.R. ............................ 239/672 |
| 1371571 | 2/1988 | U.S.S.R. . |
| 1664149 | 7/1991 | U.S.S.R. . |

OTHER PUBLICATIONS

London 4Way Combination Four–Way Dump Truck Salt and Sand Spreader Brochure.
Econo Commander Dependable Spreading at Economical Pricing Brochure.
Front or Rear spread Models . . . Air–Flo Flo 'N Dump Multi–Purpose Truck Body Brochure.
Air–Flo Extra heavy–Duty Flo 'N Dump Body Brochure.
Air–Flo Flo 'N Dump Multi–Purpose Truck Body Brochure.
Swenson Spreader Swenson L/D Series Aviation Spreaders Brochure.

(List continued on next page.)

*Primary Examiner*—Frank E. Werner
*Attorney, Agent, or Firm*—Vickers, Daniels & Young

[57] ABSTRACT

A dump truck having a dump body which includes a rotatable feedgate for adjusting the size of a passageway through a rear opening at the rear of the dump body. The rotatable feedgate is rotatably mounted within the rear opening to provide for improved control of the flow of materials within the dump body which pass through the rear opening when the feedgate is positioned into an open position. A side guide is incorporated into the rotatable feedgate to provide additional control of the flow rate of materials through the rear opening especially at low feed rates. The rotatable feedgate design includes a rotatable feedgate position for open mode hauling whereby the feedgate is repositioned in the rear of the dump body. An opening plate is also provided to be used to provide an alternative arrangement for sealing the tailgate opening while the rotatable feedgate is attached or detached from the dump body.

20 Claims, 11 Drawing Sheets

5,890,867
Page 2

U.S. PATENT DOCUMENTS

| | | | |
|---|---|---|---|
| 2,969,987 | 1/1961 | Biasi | 275/8 |
| 3,097,711 | 7/1963 | Clark | 222/556 X |
| 3,189,355 | 6/1965 | Swenson et al. | 275/8 |
| 3,191,944 | 6/1965 | Watts | 275/8 |
| 3,304,093 | 2/1967 | Van Der Lely | 275/8 |
| 3,310,293 | 3/1967 | Zimmerman . | |
| 3,329,436 | 7/1967 | Fyrk . | |
| 3,542,297 | 11/1970 | Wyrick . | |
| 3,583,645 | 6/1971 | Murray | 239/657 |
| 3,693,890 | 9/1972 | Torrey . | |
| 3,768,737 | 10/1973 | Tobias . | |
| 3,790,090 | 2/1974 | Lorenc et al. | 239/666 |
| 3,917,236 | 11/1975 | Hanson . | |
| 4,022,386 | 5/1977 | Caye | 239/657 |
| 4,068,769 | 1/1978 | Sweet et al. . | |
| 4,162,766 | 7/1979 | Ten Broeck et al. | 239/656 |
| 4,266,731 | 5/1981 | Musso, Jr. | 239/676 |
| 4,382,568 | 5/1983 | Schertz . | |
| 4,568,237 | 2/1986 | Krause et al. | 414/519 |
| 4,685,619 | 8/1987 | Harder . | |
| 4,886,214 | 12/1989 | Musso, Jr. et al. | 239/676 |
| 5,310,119 | 5/1994 | Musso, Jr. et al. | 239/672 |
| 5,397,172 | 3/1995 | Musso, Jr. et al. | 298/22 |
| 5,400,974 | 3/1995 | Musso, Jr. et al. | 239/672 |
| 5,437,499 | 8/1995 | Musso | 298/26 |

OTHER PUBLICATIONS

Swenson Spreader Electric Liquid Spray System Brochure.
Air–Flo Multi–Purpose Mini–Flo 'N Dump for 2 to 3 Vard Trucks Brochure.
Everest Snow & Ice Control Equipment Brochure.
Swenson Spreader Uni–Vee Series Brochure.
Picture of rotatable feedgate mounted in the back of a truck.
Picture of rotatable feedgate mounted in the back of a truck.

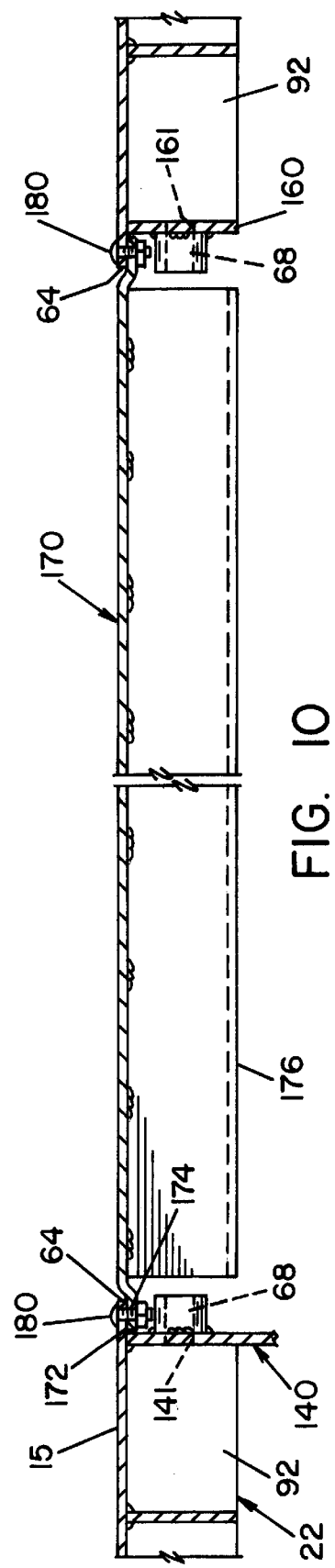
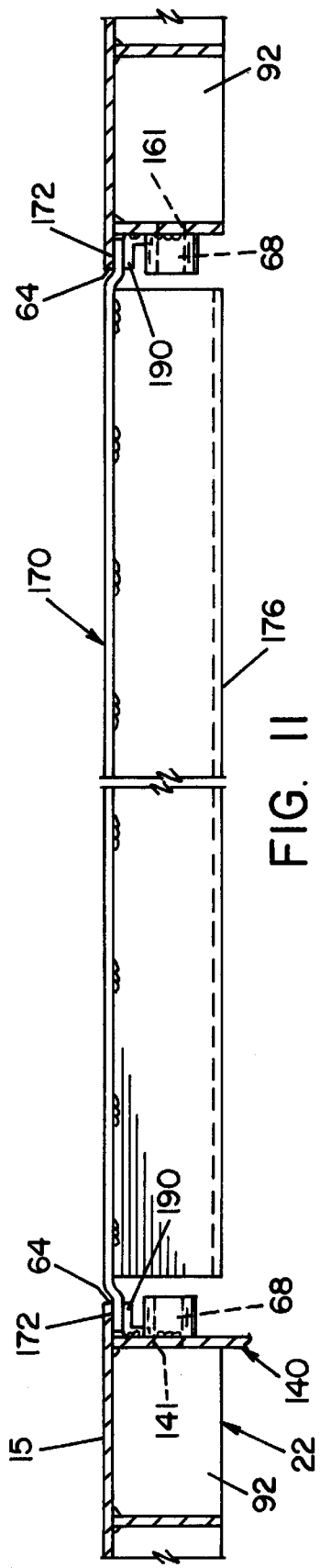

ROTATABLE FEEDGATE

The present invention is a continuation-in-part of patent application Ser. No. 524,492 filed Sep. 7, 1995.

The present invention relates to art of trucks and more particularly to a new and improved dump truck of the standard type including an integrated spreader system for conveying material through a tailgate opening which improvement allows for hauling long items when the tailgate is hauling material without interference with auxiliary structures carried by the tailgate.

INCORPORATION BY REFERENCE

My co-pending application Ser. No. 524,492 filed May 26, 1995 is incorporated herein by reference to illustrate the type of vehicle the present invention can be incorporated therein.

BACKGROUND OF THE INVENTION

Trucks such as dump trucks have commonly been used to convey materials such as salt, dirt, gravel and/or sand for the purposes of spreading these materials onto road surfaces to improve the traction of the road surface during hazardous driving conditions. Dump trucks have also been used to carry and dispense asphalt on road surface for road repair and maintenance. The materials in the truck are commonly dispensed by tilting the dump body of the truck thereby releasing the materials from the dump body and/or conveying the materials within the dump body out through an opening in the rear of the dump body. Dump trucks with integrated conveyance systems are illustrated in U.S. Pat. Nos. RE 25,709; 4,886,214; 4,266,731 and 5,397,172. These patents illustrate the common prior art methods for controlling the flow rate of material moved out of the dump body of a truck by an integrated conveyor. U.S. Pat. No. RE 25,709 illustrates the use of a slidable door and a rotatable feedgate to control the particulate flowrate from a conveyor. The slidable door similar in design to the slidable door illustrated in U.S. Pat. Nos. 4,886,214 and 4,266,731.

The sidable door is moved vertically and downwardly to control the flowrate of particulate material conveyed through the rear opening of a tailgate. The rotatable feedgate rotates about a fixed axis. The rotatable feedgate is rotated into the truck body to control the rate of discharge of material. Dump bodies used for bulk material such as asphalt and/or salt have had tailgates with openings which include rotatable feedgates or sidable doors, such as shown to U.S. Pat. No. RE 25,709. The rotatable feedgate and slidable door designs have been used for many years to control particulate flow rates from an integrated conveyor system mounted in the body of a dump truck. The slidable door disclosed in U.S. Pat. No. 5,397,172 is incorporated in a separate structure, called a hood and described in U.S. Pat. No. 4,886,214. The hood is designed to slidably shift between a forward and rearward position on the hood. The rearward shifting of the hood allows the truck to be used in the open hauling mode. Rotatable feedgates and slidable doors have long been used in combination with particulate conveying systems and rear spreaders to improve the particulate flow rate and dispersement by the conveyor from the rear of a dump truck.

Although prior spreading systems have improved the control of the flowrate of the dispensed materials from the dump body, these prior spreader systems are still inadequate for reliably controlling particulate flowrates over an extended period of time. Spreader systems which incorporate a slidable door such as shown in U.S. Pat. No. 4,886,214 are highly susceptible to jamming during operation. Slidable doors are guided by slots which maintain the door in position. These slots typically fill up with particulate material which passes through the tailgate door. Particulate material such as gravel and salt commonly gets lodged in the slots thereby preventing the slidable door from moving. Consequently, proper flow rate control of such particulate material is impaired. Dispensement of asphalt from a tailgate having a sidable door is even more problematic. Asphalt which becomes lodged in the door slots will eventually to bond the slidable door and to the slots thereby preventing further operation of the slidable door. The slots are also very susceptible to damage. The slots, over time, will deform in shape due to being bumped into by other objects, bend during operation, and/or rusting. Deformation of the slots results in impaired operation of the sidable door and ineffective control of particulate material flowrates. Rotatable feedgate designs overcome the jamming problems associated with slidable doors. Rotatable feedgates pivot about a single axis thereby essentially eliminating problems of jamming the feedgate when dispensing materials such as salt, gravel, asphalt, etc. Furthermore, the rotatable feedgate design is typically a more durable design thus less susceptible to damage during operation and daily use. However, when using a tailgate having a rotatable feedgate, low flowrate control of particulate material through the feedgate is difficult and unreliable. Due to the design of the rotatable feedgate, the opening of the rotatable feedgate allows particulate material to enter the feedgate from both the front and sides of the feedgate. The sidable door design only allows particulate material to pass through the front of the feedgate thereby providing better flowrate control of materials through the feedgate opening than rotatable feedgates, especially at low flowrates.

In the prior co-pending application, there did not exist a mechanism for actually controlling the size of the passageway while controlling side flow of a rotatable feedgate. Co-pending application Ser. No. 524,492 filed May 26, 1995 significantly improved the control of dispensing materials from a dump body, especially at low flow rates. The feedgate design overcame the problems of jamming and susceptibility to damage commonly associated with slidable door designs and further resolved the problem with the control of low particulate material flowrate associated with rotatable feedgates. The rotatable feedgate design was versatile enough to be used in a manual or automatic mode of operation and had a relatively simple and durable design. The rotatable feedgate could also be used in an open mode of operation for hauling long materials such as trees. In the open mode of operation, the rotatable feedgate was moved into the completely open position to rotate the rotatable feedgate into and behind the inner surface of the tailgate when the tailgate was opened to the laid open position. This position allowed objects to be laid over the tailgate opening during hauling. However, the versatility of the tailgate design was limited in the open mode of operation since the rotatable feedgate in the open position did not block the tailgate opening. As a result, objects being loaded and unloaded from the dump body could lodge themselves in the tailgate opening thus making the task of loading and unloading more difficult. In addition, the rotatable feedgate, in the open position, could not be used for open mode dumping or be used as a platform for dirt, sand, mulch, gravel, etc. The rotatable feedgate design of the prior co-pending invention was not compatible for using the tailgate in these operations since particulate materials could freely fall through the tailgate opening when the rotatable feedgate was in the open position. When the rotatable feedgate was in the closed position, the rotatable feedgate created an inconvenient obstruction extending upwardly from the inner surface of the tailgate thus making the rotatable feedgate essentially incompatible or inconvenient for use in these operations. As a result, there remains a demand for a truck body with a tailgate mounted flow control mechanism having the advantages of a rotatable feedgate which will allow the truck body to be used effectively in the tailgate down position. The prior co-pending application could not accomplish this function because of the inherent operation of a rotatable feedgate.

SUMMARY OF THE INVENTION

The present invention relates to trucks, particularly dump trucks and more particularly to a new and improved dump trucks of the standard type which include an improved arrangement for conveying materials through a tailgate opening and which improvement allows for open truck hauling of various types of materials without interference with any structures incorporated in the tailgate.

In accordance with a preferred embodiment of the present invention, there is provided a truck having a dump body having two side walls, a base and a rear end and front end. The rear end includes an opening which can be manipulated to control the dispensement rate of the contents within the dump body through the rear opening. The size of the aperture in the rear opening is manipulated by an adjustable feedgate which is rotatably mounted in the rear opening. The side walls of the dump body are positioned essentially perpendicular to the base of the dump body or are angularly positioned with respect to the base so as to provide sloped surfaces. Preferably, the side walls of the dump body includes an angually sloped section which slopes downward to the base of the dump body. At the base of the dump body, there is preferably incorporated therein a conveyor system which rearwardly moves material within the dump body toward the opening in the rear end of the dump body. Preferably, the conveyor system extends longitudinally from the forward end to the rear end of the dump body and is evenly spaced between the two side walls of the dump body. The rear opening is preferably in longitudinal alignment with the conveyor system so that the materials in the dump body moved to the opening by the conveyor system will directly exit the dump body through the opening. The rear opening preferably has a width which is generally equal to the width of the conveyor belt of the conveyor system and the height of the opening is preferably less than half the height of the dump body. The rotatably adjustable feedgate mounted in the rear end of the dump body and preferably in the rear opening is adjustable by manual and/or mechanical means. The feedgate is designed to regulate the rate at which the material contents of the dump body are dispensed from the dump body through the rear opening.

In accordance with the present invention, the rear end of the dump body preferably includes a tailgate which is pivotly attached to the rear end of the dump body. The tailgate includes the rear opening. The tailgate of the dump body permits the truck to be used in a closed mode of operation wherein the tailgate is in the closed position and the contents of the dump body are conveyed toward the rear end of the dump body and through the rear opening in a controlled manner. The rotatable feedgate is also designed to be mounted on the tailgate in the rear opening such that the tailgate can be used in an open mode operation wherein the tailgate is in laid open position wherein the tailgate extends in essentially the same plane as the base of the truck dump body.

In accordance with another aspect of the present invention, the rear opening includes two side walls and a top wall and the feedgate is rotatably mounted in the rear opening to the two side walls of the rear opening. Such a mounting configuration facilitates in a compact and simplified mechanism for controlling the feedgate position within the rear opening of the dump body. The rotatable feedgate includes an edge guard which is in contact with or closely adjacent to the conveyor belt when the feedgate is in the closed position. In the closed position, the rotatable feedgate blocks the materials in the dump body from passing through the rear opening. As the feedgate is rotated into an open position, the edge guard of the rotatable feedgate upwardly retracts in a generally upward arc from the conveyor belt surface and controllably allows materials in the dump body to pass through and/or be conveyed through the rear opening.

In accordance with another feature of the present invention, the rotatable feedgate includes a feed guide having two panels positioned generally perpendicular to one another and rotatably mounted to each of the side walls of the rear opening. The feed guide is preferably mounted such that the feed guide can either be immediately retracted from the base of the dump body as the edge guard is retraced or delay in retraction until the edge guard has retracted to a minimum predefined position. Once the edge guard has reached or exceeded the predefined position, the edge guard and the feed guide simultaneously retract until the rotatable feedgate is positioned in the completely open position. The feed guide also can be mounted such that the feed guide retracts at a similar or different rate from the retraction rate of the edge guard. The feed guide is designed to add additional control to the dispersement of the materials from the dump body by limiting the size of the rear opening as the edge guard is retracted. This feedgate design provides additional control to the dispensement rate of the materials at low dispensement rates by controlling the flowrate of materials through the sides of the rotary feedgate.

In accordance with another aspect of the present invention, the rotatable feedgate can be mounted such that the rotatable feedgate can be manually opened and closed in an easy and efficient manner. Furthermore, the rotatable feedgate is also designed such that an automated system such as a hydraulic drive may be connected to the feedgate to move the feedgate in both an open and closed position. The hydraulic system can include an electrical control system arranged in the cab of the truck to allow an operator to operate the hydraulic system and control the dispensement rate of materials from the dump body of the truck.

In accordance with still yet another aspect of the present invention, the rotatable feedgate can be repositioned in the tailgate opening to close the tailgate opening and to minimize the protrusion of the feedgate from the inner surface of the tailgate. Such repositioning of the rotatable feedgate facilitates in using the feedgate in an open mode of operation. In the open mode of operation, the rotatable tailgate is opened and lies in essentially the same plane as the bottom of the dump body. In this mode of operation, long objects can be hauled, materials can be manually loaded into the dump body, etc. The rotatable feedgate is thus designed to be readily converted between a closed mode of operation and an open mode of operation by the repositioning the feedgate in the tailgate opening. Preferably, the rotatable feedgate is rotatably mounted on a pin, which pin can be easily and conveniently removed. The removal of the pin allows the rotatable feedgate to be repositioned and then retracted in the tailgate opening. Such a rotatable feedgate design allows for the dump body to be used for hauling, dumping and spreading of materials from the dump body of the truck.

In accordance with another aspect of the present invention, a plate is positioned over the tailgate opening to form a substantially flat surface on the inner surface of the tailgate. The plate covers the tailgate opening and provides a substantially flat and continuous surface for when the tailgate is used in an open mode of operation. The plate is preferably a durable material such as steel. The plate may be positioned on top or positioned on the underside of the tailgate inner surface. The plate is preferably bolted in position; however, other mechanism such as brackets, latches, pins, etc. can be used to mount the plate in the tailgate opening. The plate is preferably designed to be positioned on the tailgate when the rotatable feedgate is rotatably attached to the tailgate or when the rotatable feedgate is removed from the tailgate. The rotatable feedgate, when attached to the tailgate, is preferably rotated to the complete open position prior to mounting the plate over the tailgate opening.

The primary object of the present invention is to provide a truck which can dispense material in a controlled manner.

Another object of the present invention is to provide a tailgate having a rotatable feedgate mounted in a tailgate opening which feedgate is designed to resist jamming and damage during operation of the feedgate.

Still another object of the present invention is to provide a truck having a dump body which dump body includes an opening having a rotatable feedgate which is rotatably incorporated into the opening of the dump body. The rotatably mounted feedgate is designed to control the rate of dispensement of materials from the dump body through the feedgate.

In accordance with still another object of the present invention, the rotatable feedgate is mounted into the tailgate of the dump body such that the tailgate can be positioned in a closed mode of operation to control the dispensement of the contents of the dump body through the tailgate opening and an open mode of operation whereby the tailgate in a laid open position.

In accordance with still yet another object of the present invention, the rotatable feedgate includes two feed guides mounted to the side of a rotary feedgate and are designed to regulate the flow of materials from the dump body through the sides of the rotary feedgate especially at relatively low feed rate settings.

Another object of the present invention is a rotatable feedgate which is designed to be opened and closed manually or by automated operation.

Another object of the present invention, the rotatable feedgate design is simple and easy to operate and provides excellent control of the rate of dispensement of materials from the dump body.

Still yet another object of the present invention, the dump body includes a conveyor system incorporated into the base of the dump body which acts in cooperation with the rotatable feedgate to dispense materials from the dump body to better control the rate of dispensing of the materials from the dump body.

Still another object of the present invention is to provide a rotatable feedgate which can be easy and effectively repositioned in the tailgate opening for use in an open mode of operation.

Still yet another object of the present invention is to provide a plate which can be mounted on to the tailgate to close the opening in a tailgate for use in open mode of operation.

Another object of the present invention is to provide a rotatable feedgate which can be easily removed and/or have its axis of rotation repositioned in the tailgate opening during open mode of operation.

Yet another object of the present invention is to provide a system for controlling the rate of dispensement of materials from a truck which is economical to install and easy to operate.

These and other objects and advantages will become apparent to those skilled in the art upon reading the following description taken together with the preferred embodiment disclosed in the accompanied drawings.

BRIEF DESCRIPTION OF THE DRAWINGS

Reference may now be made to the drawings, which illustrate various preferred embodiments that the invention may take in physical form and in certain parts and arrangement of parts wherein;

FIG. 10 is a cross-sectional view taken along line 10—10 in FIG. 8;

FIG. 11 is a cross-sectional view taken along the same cross-section as in FIG. 8 and illustrates another embodiment of the invention;

DETAILED DESCRIPTION OF THE PREFERRED EMBODIMENTS

Figure 1:
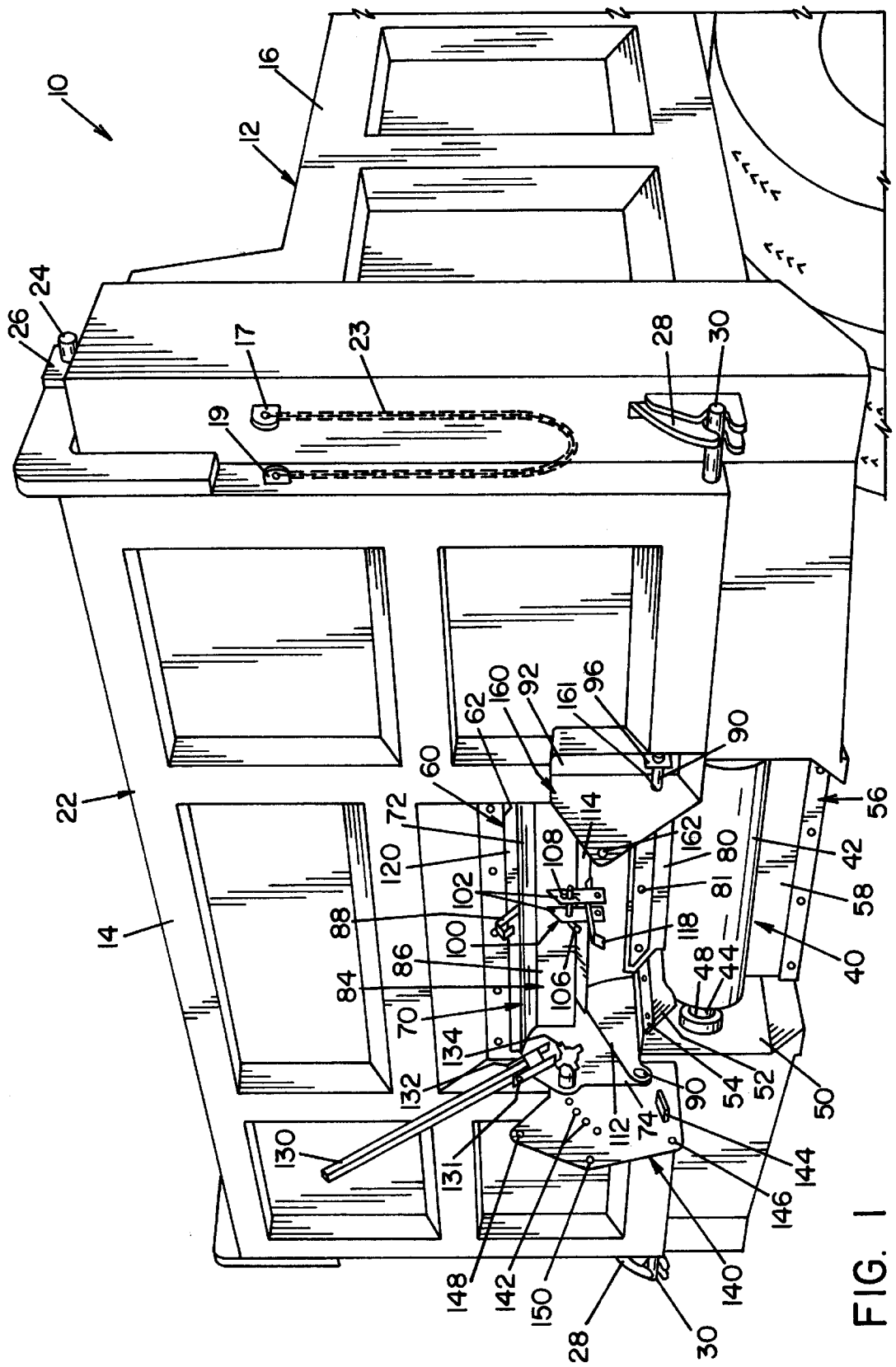
FIG. 1 is a partial perspective view of a truck which includes the rotatable feedgate shown closed in accordance with the present invention.

Referring now to the drawings wherein the showings are for the purpose of illustrating preferred embodiments of the invention only and not for the purpose of limiting the same, FIG. 1 illustrates a dump truck 10 which includes the rotatable feedgate of the present invention. Truck 10 includes a dump body 12 mounted on a truck frame, not shown. The dump body may be elevated for pivotal movement about a rear axis such that the dump body is pivoted between a normal or horizontal position. Although not shown, dump body 12 may be raised by a hydraulic lift such as a telescopic lift which is connected to the truck frame at the forward end of truck 10 to hydraulically raise and lower dump body 12 in a conventionally known manner.

Figure 2:
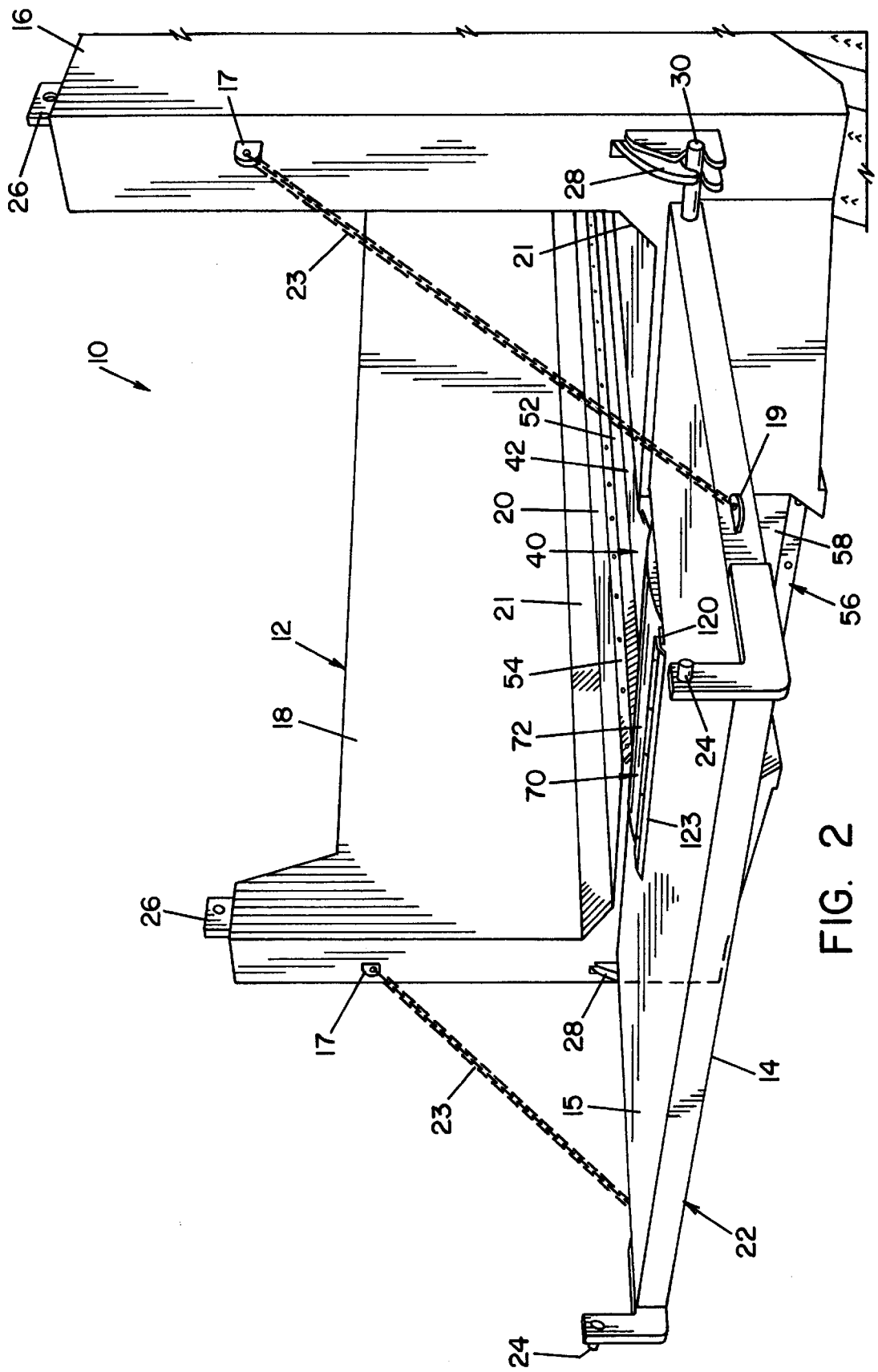
FIG. 2 is a partial perspective view of a truck which illustrates the tailgate in an open mode position and the rotatable feedgate repositioned in the tailgate opening for open mode operation.

Dump body 12 includes a rear end 14, two sides 16 and 18, a base 20 and a front side. As shown in FIG. 2, a sloped surface 21 is positioned between sides 16 and 18 and base to facilitate in the directing of materials in the dump body to the center of the dump body. Rear end 14 preferably is a movable tailgate 22. As shown in FIG. 1, tailgate 22 is positioned in a closed position. In a conventional manner, tailgate 22 is pivotally mounted at the top and bottom of the tailgate. As shown in FIG. 1, tailgate 22 is mounted for pivotal movement about an upper transverse horizontal axis. A pair of tailgate pivot pins 24 are mounted on the tailgate and are inserted in cooperation with pivot bearings 26 which are attached to the back top ends of sides 16 and 18.

As shown in FIG. 1, tailgate 22 is maintained in close position by tailgate latches 28 which are used to latch tailgate latch bars 30 which are attached to the tailgate. The tailgate latches are proximately located near lower back ends of sides 16 and 18. The latches are used to latch the tailgate in its closed position. Tailgate latches 28 are unlatched to dump the material contents of dump body 12 through the rear of dump body 12 when the dump body is elevated from the front of the truck.

Tailgate 22 can be pivoted about a lower transverse horizontal axis to a laid open position as shown in FIG. 2. Tailgate pivot pins 24 are disengaged from tailgate pivot bearing 26. Tailgate 22 is then lowered to its laid open position. The procedure is reversed for remounting the tailgate for pivotal movement about its upper transverse axis. A chain 23 is attached to chain tabs 17 and 19 which are connected to the tailgate and the dump body side 16 and/or 18 respectively to maintain the tailgate in the laid open position. When the tailgate is in the laid open position, the inner flat face of the tailgate provides a rearward extension of the generally flat dump body base. This tailgate position can be used for open truck hauling and open truck dumping.

Figure 3:
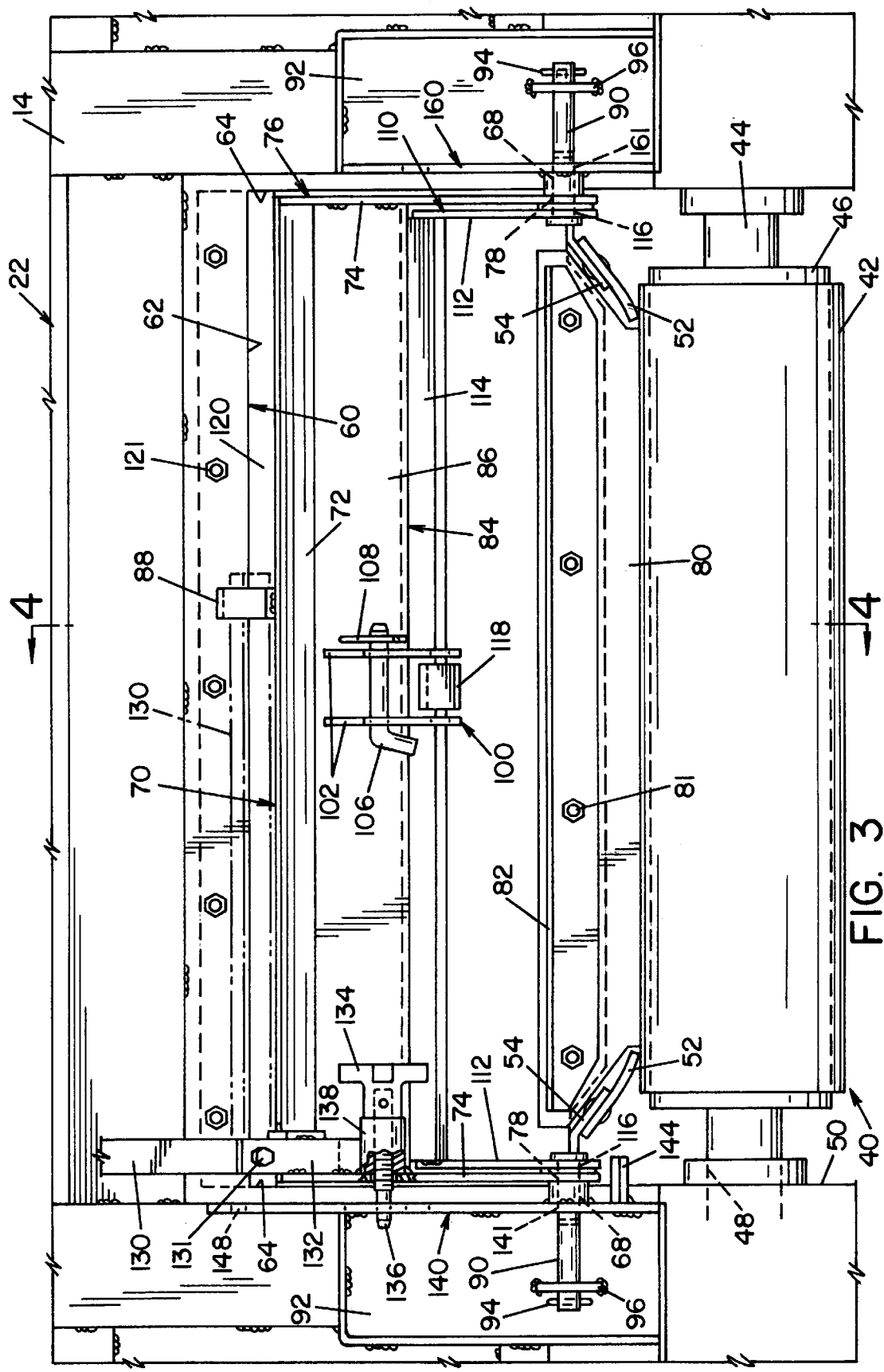
FIG. 3 is an enlarged view of the rear of the truck as shown in FIG. 1.
Figure 5:
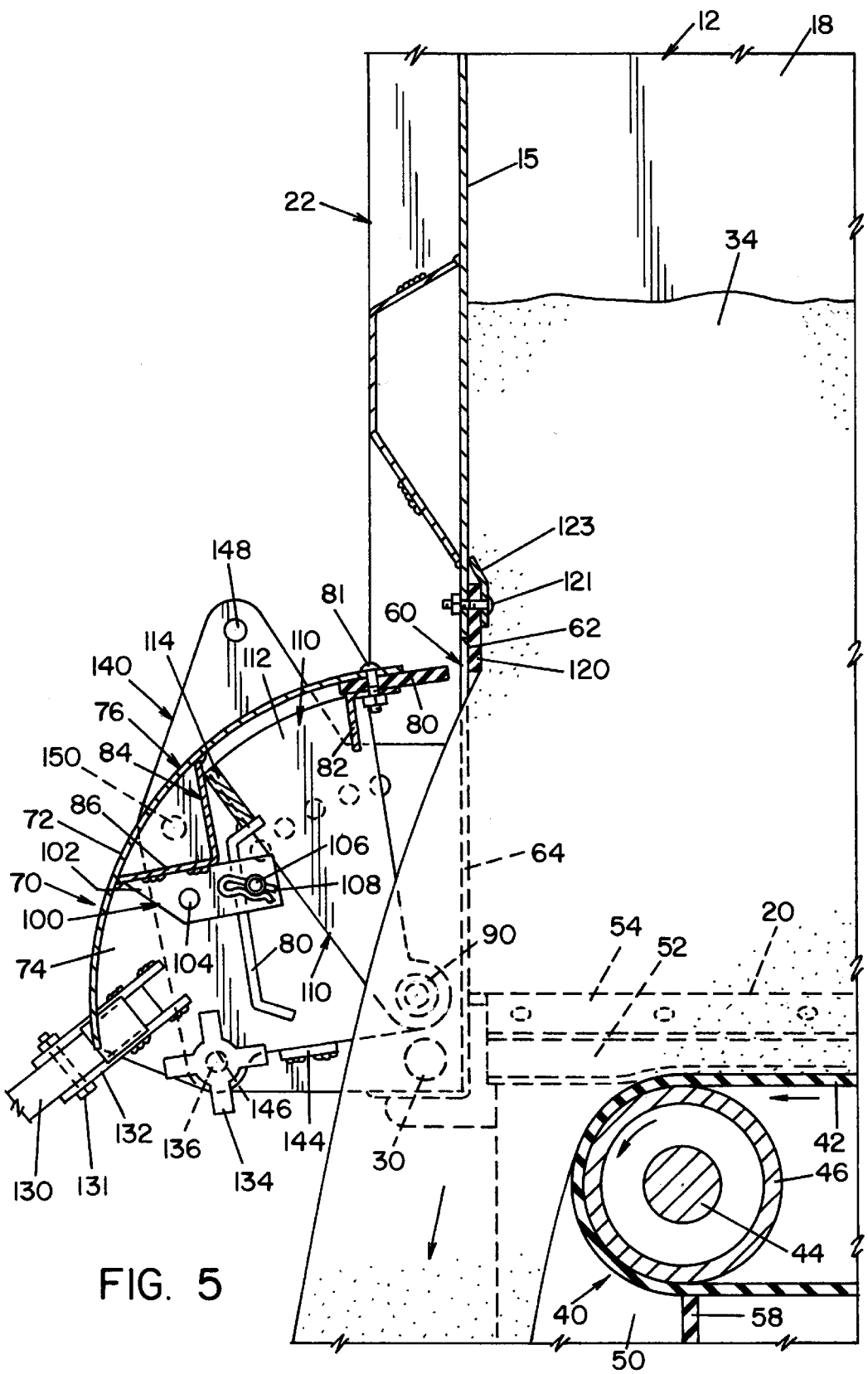
FIG. 5 is still another cross-sectional view taken along the same cross-section as in FIG. 4 wherein the rotatable feedgate is in a completely open position.

As best illustrated in FIGS. 3 and 5, a conveyor system 40 is integrated into the dump body 12 of truck 10 to provide a multi-purpose truck which may be used in both a dump mode and a closed mode of operation by simple manual or automatic conversion of truck 10 between these two modes. The dump mode of operation is the dispensement of materials from the dump body through tailgate 22 when tailgate latch bars 30 are disengaged from tailgate latches 28 as dump body 12 is raised. The closed mode of operation is the dispensement of materials from the dump body through an opening 60 when the tailgate is latched in the closed position.

The conveyor system 40 comprises a central longitudinally extending conveyor belt 42 integrated into the base of dump body 12. Conveyor 40 is preferably mounted in a conveyor recess 50 in base 20 of the dump body 12 such that conveyor belt 42 is receded from the surface plane of base 20. The conveyor system comprises a central, longitudinally extending conveyor belt 42 integrated into the base of dump body 12. The effective width of conveyor system is established by conveyor recess 50 which is an overlying, longitudinally extending opening having a pair of laterally spaced down turned edges of the outer co-planar sections of the dump body base. The conveyor recess includes sloped surfaces 52 mounted on slope mount 54. The sloped surface forms a sloped surface from the surface plane of base 20 to the top surface of the conveyor belt. The sloped surfaces are preferably flexible so as not to damage the conveyor belt and are preferably made of a rubber material which is durable and wear resistant to the various types of materials 34 conveyed in the dump body. A back flow shield 56 is mounted in conveyor recess 50 below conveyor belt 42. Back flow shield 56 includes a blade 58 which is preferably flexible and is positioned in contact or closely adjacent to the bottom surface of conveyor belt 42. The back flow shield is designed to prevent materials conveyed by the conveyor belt to be drawn under the truck. The conveyor system also includes a front sprocket shaft, not shown, and rear sprocket shaft 44. Each sprocket shaft has a laterally spaced conveyor drum 46 for supporting a laterally spaced conveyor belt 42. The sprocket shafts are mounted into recess 50 in shaft holes 48. Conveyor belt 42 may be a chain linked belt, a fabric belt, a rubber belt, etc. The belt may be flat or include ribs to facilitate in the conveyance of material 34 in the dump body. A suitable hydraulic, electric or combustion drive mechanism, which is not shown, is connected to the front or rear sprocket shaft 44 for driving conveyor belt 42. The conveyor belt, sprocket shafts and conveyor sprockets are all mounted in recess 50 such that the top of the conveyor belt is preferably positioned below the surface of base 20. As shown in FIGS. 1 and 3, the conveyor system is preferably positioned along the longitudinal center of base 20 of dump body 12. As previously discussed, side walls 16 and 18 of the dump body include a sloped section 21 designed to direct materials 34 toward the center of base 20, into recess 50 and onto the surface of belt 42.

The conveyor system can be used in a rear or front dispensing mode of operation by operating the conveyor system to convey the material contents of the dump body to the rear end or front end of dump body. For rear dispensing, a rear spinner, not shown, is preferably mounted onto the rear truck frame or tailgate 22 to dispense the materials at the rear of the truck and to spread the dispensed materials onto the roadway. The rear spreader is preferably in longitudinal alignment with the conveyor system and the tailgate opening so as to properly spread the materials exiting opening 60. A gravity chute, not shown, is preferably included to direct the dispense materials from the tailgate opening to the spinner thereby properly spreading the material throughout the roadway. The spinner is also preferably mounted such that it can be rotated and positioned below the gravity chute or rotated in a retracted position to allow the tailgate to be opened and the materials removed from dump body 12 without coming in contact with the spinner. A suitable hydraulic drive or electric motor system is preferably connected to the spinner to drive the spinners. A control system is preferably integrated with the spinners conveyor system to control the amount of materials dispensed from dump body 12 to spread such materials throughout the roadway. A similar arrangement may be used for dispensing materials at the front of the dump body.

Referring to FIGS. 1 and 3, tailgate 22 includes a rotatable feedgate 70 which controls the flow rate of materials 34 out of dump body 12 which are conveyed to tailgate 22 by conveyor system 40 when the truck is in the closed mode of operation. Rotatable feedgate 70 is mounted on tailgate 22 and operates in opening 60. As discussed above, opening 60 is preferably positioned in longitudinal alignment with conveyor system 40. As shown in FIG. 1, opening 60 is rectangular in shape and extends from the base of tailgate 22 to a height of less than about ½ the height of tailgate 22. Opening 60 includes a tailgate top 62 and two sides 64.

Figure 4:
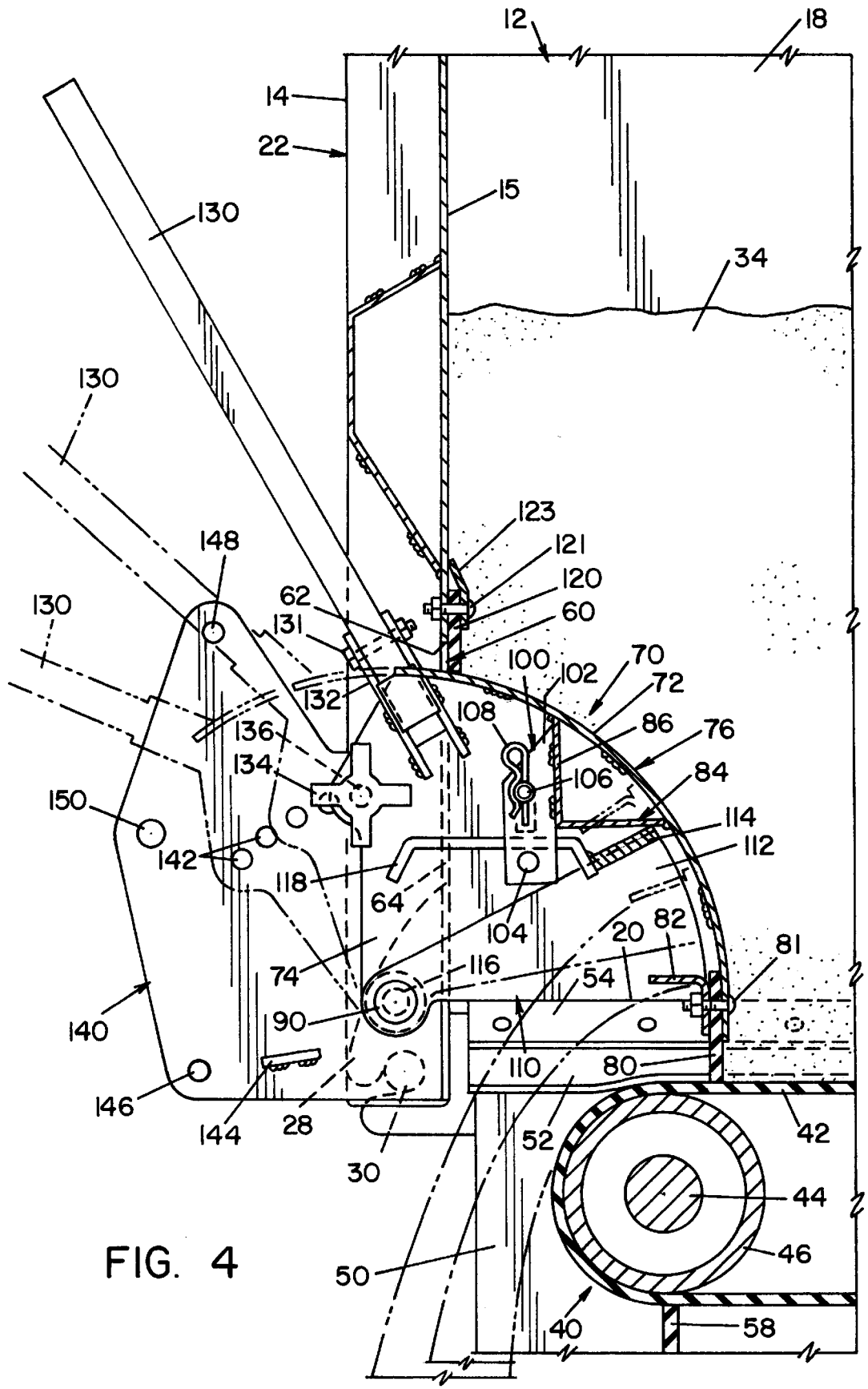
FIG. 4 is an enlarged cross-sectional view taken along line 3-4 in FIG. 3 which illustrates the rotatable feedgate in a closed position and also illustrates several intermediate feedgate positions.

Rotatable feedgate 70 is mounted to be selectively positioned either manually or automatically in several modes of operation. Referring now to FIG. 4, rotatable feedgate 70 includes a face plate 72 and two side plates 74 which forms a feedgate cap 76. Attached to the front edge of face plate 72 is edge guard 80. Edge guard 80 is preferably a flexible material made of a flexible and durable rubber material. The use of a flexible edge guard eliminates or significantly reduces damage to the conveyor belt 42 when the feedgate is in the closed position. Edge guard 80 is shaped such that the edge guard will fit down into and between conveyor recess 50. As shown in FIG. 4, edge guard 80 is positioned closely adjacent to and/or engages the top surface of conveyor belt 42 when feedgate cap 76 is in the closed position. Edge guard 80 is preferably connected to face plate 72 by a bolt and nut assembly 81.

FIG. 4 illustrates rotatable feedgate 70 is in the closed position and two intermediate positions. In the closed position, the base of face plate 72 and the base of side plates 74 of cap 76 are in contact with or closely adjacent to and in parallel relationship to base 20 of dump body 12 and edge guard 80 is in contact with or closely adjacent to the top of conveyor belt 42. In the closed position, materials 34 in dump body 12 are prevented from passing through opening 60 even when conveyor system 40 is in operation.

The width of face plate 72 is designed to be slightly less than the width of tailgate opening 60 to allow the face plate to pass through the opening. Face plate 72 is preferably curvilinear in shape. Face plate 72 preferably has a radius slightly less than the distance between base 20 and top 62 of opening 60. When cap 76 is in the closed position, face plate 72 extends essentially from base 20 to top 62 of opening 60. The arcuate shape of face plate 72 allows the face plate to be easily rotated between the closed and completely open position as illustrated in FIGS. 4 and 5. Two sides plates 74 are attached to the edges of face plate 72 to form cap 76. The side plates are preferably welded together, but can also be bolted together. The rotatable feedgate is attached in opening 60 by positioning side plates 74 into opening 60 and closely adjacent to side walls 64 of opening 60. Side plates 74 each include a pin opening 78 located near the lower back edge of the side plates and generally in the surface plane of base 20 for axial movement of the feedgate about base 20. Pin opening 78 of each side plate is aligned with a pin hole 68 located in each side wall 64 of opening 60. A feedgate pin 90 is inserted through pin opening 78 and pin hole 68 of each side plate until the end of each pin passes through pin hole 141 of lock flange 140 or pin hole 161 of reposition flange 160 and into each pin chamber 92 thereby attaching cap 76 in opening 60. Both feedgate pins 90 are locked into position by attaching a pin clip 94 to the end of pin 90. A bracket 96 supports pin 90 in pin chamber 92. Pin chamber 92 is a cavity in tailgate 22 positioned adjacent to each side wall 64 of opening 60. The pin chamber allows for easy access to pin 90 to allow an operator to easily mount and dismount the cap 76 in opening 60. The pin arrangement for the feedgate cap allows the feedgate cap to be rotated within opening 60 about pins 90.

Face plate 72 includes a guide lift 82 attached to the interior front edge of the face plate. Face plate 72 also includes a housing 84 attached on the interior edge of face plate 72 and evenly positioned between side plates 74. Housing 84 is generally "L" shaped and forms a generally straight surface 86 which lies in a plane that is generally perpendicular to base 20 of dump body 12 when feedgate 70 is in a closed position. A bar holder 100 is attached to surface 86 and includes two holder flanges 102 mounted parallel to one another. Each holder flange includes at least two holes 104 aligned such that a holder pin 106 can be inserted between the two holder flanges. A pin lock 108 is used to secure pin 106 in the holes of the holder flange. Guide lift 82 is designed to lift side guide 110 which is described in more detail below.

Feedgate cap 76 includes a safety bar 88 which is connected to the top edge of face plate 72. Safety bar 88 is designed to engage top 62 of opening 60 when feedgate cap 62 is moved into the closed position. Safety bar 88 prevents the rotatable feedgate from over closing causing damage to base 20 of container 12 or to the conveyor belt 42.

A cap seal 120 and seal guard 123 are attached to the top of opening 60 by a nut and bolt assembly 121 to seal the space between face plate 72 and the top of opening 60. The cap seal is preferably a flexible and durable material such as rubber which is designed to slightly flex as feedgate cap 76 is opened and closed and to maintain a tight seal with the surface of the face plate. The seal formed by cap seal 120 and seal guard 123 prevents materials 34 in dump body 12 from passing between top 62 of opening 60 and cap 76.

Referring now to FIGS. 1, 3 and 4, rotatable feedgate 70 includes a side guide 110. Side guide 110 includes two side panels 112 and a guide top 114 extending between the two side panels. Each side panel 112 is positioned between and closely adjacent to side plates 74. Side guide 110 is movably attached to pin 90 by passing pin 90 through pin hole 116 on each side panel 112. As shown in FIG. 4, the side panels of side guide 110 preferably rests on base 20 and adjacent to each side of conveyor recess 50 when rotatable feedgate 70 is in the closed position. Each guide side preferably extends nearly to the interior surface of face plate 72 and has a arcuate shaped front edge having a radius which is preferably slightly less than the radius of the face plate. As will be described in more detail below, side guide 110 cooperates with cap 76 to control the flow rate of materials 34 from dump body 12, through opening 60, especially at slower flow rates.

Side guide 110 preferably moves independently from cap 76. As a result, side guide 110 can be configured either to move simultaneously with the movement of cap 76 or move with cap 76 only after the cap has moved beyond a preset position. Attached to guide top 114 is guide bar 118. Guide bar 118 is preferably positioned between side panels 112 and the guide bar.

As shown in FIG. 1, rotatable feedgate 70 includes a lever 130 for manual opening and closing of the feedgate. Lever 130 is located near the top edge of face plate 72 and is mounted on lever mount 132 which is attached to side plate 74 nearest to side 18 of dump body 12. Lever 130 is connected to lever mount 132 by lever bolt 131. When lever 130 is not in use, the lever bolt is removed and lever 130 is repositioned and reconnected in lever mount 132 to lie essentially perpendicular to side plate 74. A feedgate lock pin 134 is positioned on side plate 74 adjacent to lever mount 132. Positioned adjacent to lever mount 132 is a lock flange 140 extending outwardly from tailgate 22. Lock flange 140 includes several lock holes 142 and a flange platform 144. Lock flange 140 is designed to lock feedgate 70 into position. Lock pin 134 is inserted into lock flange 140 to secure rotatable feedgate 70 in its various open and closed positions as shown in FIGS. 4 and 5. Rotatable feedgate is rotated into a desired position by moving lever 130 until lock pin 134 is aligned with the desired lock hole 142. Lock pin 134 is then inserted into lock hole 142 thereby securing rotatable feedgate 70 into position. Lock pin 134 may be secured into position by a spring mechanism 138. As best illustrated in FIG. 3, lock pin 134 includes a pin 136 held in the forward position by spring 138. In the completely open position of rotatable feedgate 70 as shown in FIG. 5, the edge of side plate 74 rests upon flange platform 144. Lock pin 134 is positioned in open lock hole 146 thereby locking rotatable feedgate 70 in a completely open position.

Referring now to FIGS. 4 and 5, rotatable feedgate 70 controls the dispensement rate of materials 34 within dump body 12. Rotatable feedgate is manually positioned in its various open and closed positions to control the flow rate of materials through opening 60. As shown in FIG. 4, when rotatable feedgate 70 is in the closed position, the base of cap 76 is in contact with and in parallel relationship to base 20 of dump body 12 and edge guard 80 extends into conveyor recess 50 and into contact with conveyor belt 42. This closed position essentially seals opening 60 thereby preventing materials 34 from exiting through the opening even when conveyor system 40 is in operation.

When rotatable feedgate 70 is in a slightly open position, a small amount of materials 34 within dump body 12 is allowed to exit through opening 60. Lever 130 is pulled down by an operator causing the rotatable feedgate to rotate about feedgate pin 90 until the feedgate is opened to the desired position. The rotatable feedgate and feedgate pin design resist being jammed by particulate material flowing through the tailgate opening thus allowing the rotatable feedgate to be positioned for desired flowrate control. The simple yet durable feedgate pin design resists deformation during operating thus providing continued operation of the rotatable feedgate through various types of operating conditions. Once the rotatable feedgate is rotated into the desired position, the rotatable feedgate is locked into position by inserting lock pin 134 into lock holes 142. The base of cap 76 moves in a non-parallel relationship to base 20 as the cap is rotated into an open position. The rate of flow of material 34 through opening 60 is maintained relatively constant by the operation of conveyor system 40 to continuously force material 34 under cap 76 and through opening 60. Side guide 110 is shown to be resting on base 20 of dump body 12 in the closed and slightly open position of rotatable feedgate 70. The side guide prevents the flow of material under side plate 74 and only allows the material to pass under face plate 72 of cap 76. The sides of cap 76 are extended by side guide 110 as cap 76 is moved into the slightly open position. Such a configuration allows for greater control of the flow of material through opening 60, especially at low material flow rates. When rotatable feedgate 70 is opened beyond a preselected open position, side guide 110 is caused to be raised from base 20 to allow additional amounts of material 34 to flow through opening 60. Side guide 110 is raised by guide lift 82 contacting guide top 114 and thereby causing side guide 110 to be raised. Conveyor system 40 is operated to maintain a relatively even flow of material through opening 60. Although not shown, side guide 110 can be mounted such that it will raise up from base 20 of dump body 12 simultaneous with cap 76. Such a configuration is achieved by placing holder pin 106 through holder holes 104 located below guide bar 118 when rotatable feedgate 70 is in the closed position. In this arrangement, holder pin 106 will cause guide bar 118 to be immediately lifted as cap 76 is moved to the open position thereby causing side guard 110 to be simultaneously lifted from base 20.

Referring now to FIG. 5, rotatable feedgate 70 is illustrated in its completely open position whereby the edge of side plate 74 is resting on flange platform 144. Rotatable feedgate 70 is locked into the completely open position by inserting lock pin 134 into open lock hole 146 on lock flange 140. In the completely open position, the materials within dump body 12 freely pass through opening 60 at the maximum rate of dispensement. Conveyor system 40 is operated to assist in the high flow rate of material through opening 60. In the completely open position, side guide 110 is preferably locked into position to prevent it from moving by locking guide bar in bar holder 100 by holder pin 106, as shown in FIG. 5.

It will be appreciated that conveyor system 40 may be remotely controlled by an operator in the driver's cab. Further, the feedgate and conveyor system can be connected to an automated system to provide for easy operation by an operator while driving the truck.

Although not shown, it can be appreciated that dump body 12 can be converted into an open mode of operation by opening tailgate 22 to the laid open position. In such an operating mode, rotatable feedgate 70 is preferably positioned in its completely open position. In the completely open position, rotatable feedgate 70 is retracted into the tailgate opening 60 such that feedgate cap does not extend beyond the plane surface formed by inner surface 15. Such a configuration allows for long objects such as logs and trees to be laid flat in the dump body. However, the completely open position of the rotatable feedgate only allows the dump body to be used in limited types of open hauling modes of operation. Open hauling dumping of small materials such as gravel, dirt, sand, asphalt, etc. are impaired by the positioning of the tailgate in the completely open position since such position of the tailgate forms a hole in the tailgate to allow such materials to pass through the tailgate opening. Furthermore, the hole formed by the feedgate impairs the loading and unloading of the dump body when the tailgate is in the laid open position. In order to remedy this problem, rotatable feedgate 70 is designed to be re-positionable in the tailgate opening 60 when the dump body is to be used in the open mode of operation.

Figure 6:
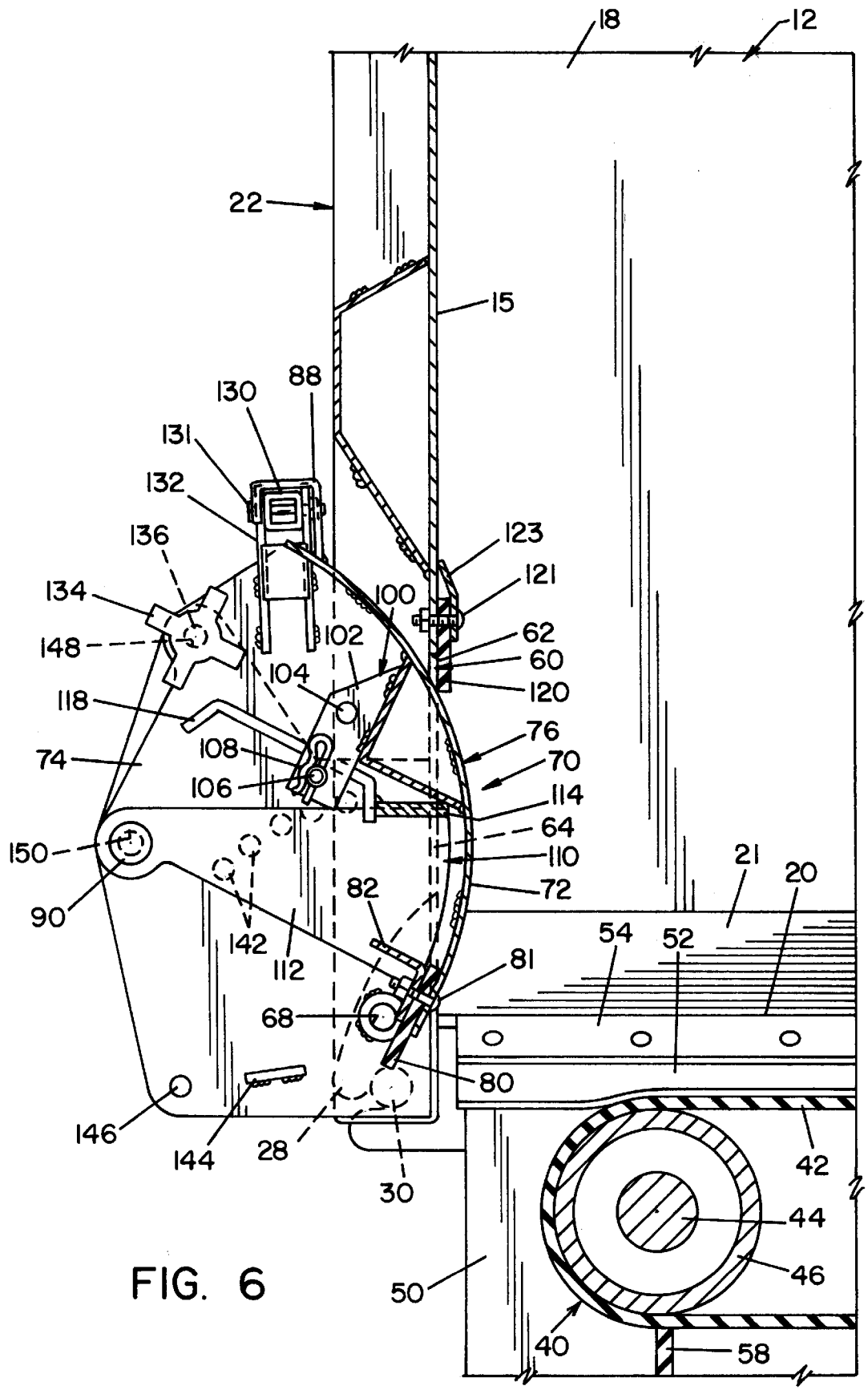
FIG. 6 is another cross-sectional view taken along the same cross-section as in FIG. 3 wherein the rotatable feedgate is repositioned in the tailgate opening to form a closely flush surface with the inner surface of the tailgate.
Figure 7:
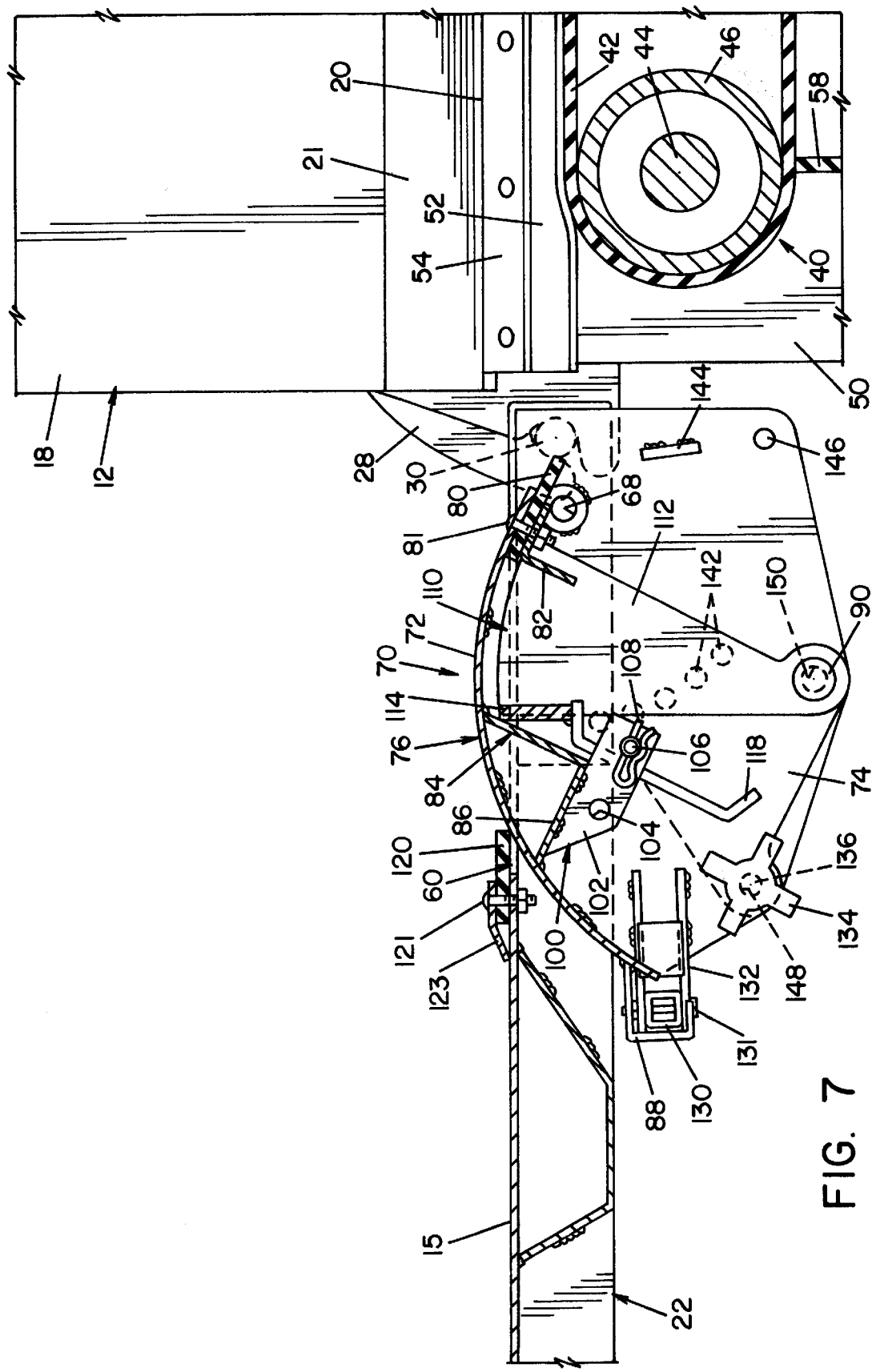
FIG. 7 is an enlarged partial cross-section view of the tailgate shown in FIG. 2.

Referring now to FIGS. 2, 6 and 7, rotatable feedgate 70 is re-positioned in opening 60 such that face plate 72 lies substantially in the plane defined by the inner surface 15 of tailgate 22. FIGS. 2 and 7 illustrate the re-positioned rotatable feedgate 70 for open mode of operation when the tailgate is in the laid open position. FIG. 6 illustrates the re-positioned rotatable feedgate when the tailgate is in the closed position. The re-positioning of the rotatable feedgate is accomplished by the removal of the two pins 90 from their respective pin holes 116 and pin opening 78 of side guide 110 and rotatable feedgate 70 respectively. Feedgate lock pin 134 is also removed from lock holes 142 or 146 thereby allowing the rotatable feedgate 70 to be removed from and/or re-positioned in opening 60.

Once rotatable feedgate 70 is detached from opening 60, the rotatable feedgate is re-positioned by moving the feedgate until the pin holes 116 of side guides 110 and pin opening 78 of rotatable feedgate 70 are lined up with lower re-position hole 150 of lock flange 140. Once the pin holes are lined up, feedgate pin 90 is re-positioned into the pin hole 116 and pin opening 78. The pin hole 116 and pin opening 78 on the other side of rotatable feedgate 70 and side guide 110 are aligned with re-position hole 162 of re-position flange 160. Once the pin hole and pin opening have been properly aligned, feedgate pin 90 is inserted through the hole and opening. Once rotatable feedgate 70 and side guide 110 are secured to lock flange 140 and re-position flange 160, rotatable feedgate 70 is rotated until lock pin 134 is aligned with upper re-position hole 148 of lock flange 140. Lock pin 134 is then inserted through upper re-position hole 148 and secured in the hole thereby completing the re-positioning of rotatable feedgate 70 in tailgate opening 60. As best illustrated in FIG. 6, the axis of rotation of rotatable feedgate 70 is re-positioned such that the axis lies in substantially the center of opening 60. By re-positioning the rotatable feedgate as such, face plate 72 forms a substantially flatter surface with respect to inner surface 15 and also seals opening 60. As illustrated in FIGS. 2 and 7, the re-positioned rotatable feedgate 70 provides for a substantially flat surface over the tailgate opening 60 thereby allowing the dump body and tailgate to be used in various types of open mode operations. Once the open mode of operation is completed and the use of the tailgate in the closed mode of operation is desired, the tailgate is re-positioned such that the pin openings and holes in rotatable feedgate 70 and side guide 110 are realigned with pin hole 68 and are then connected therein by feedgate pin 90.

Figure 8:
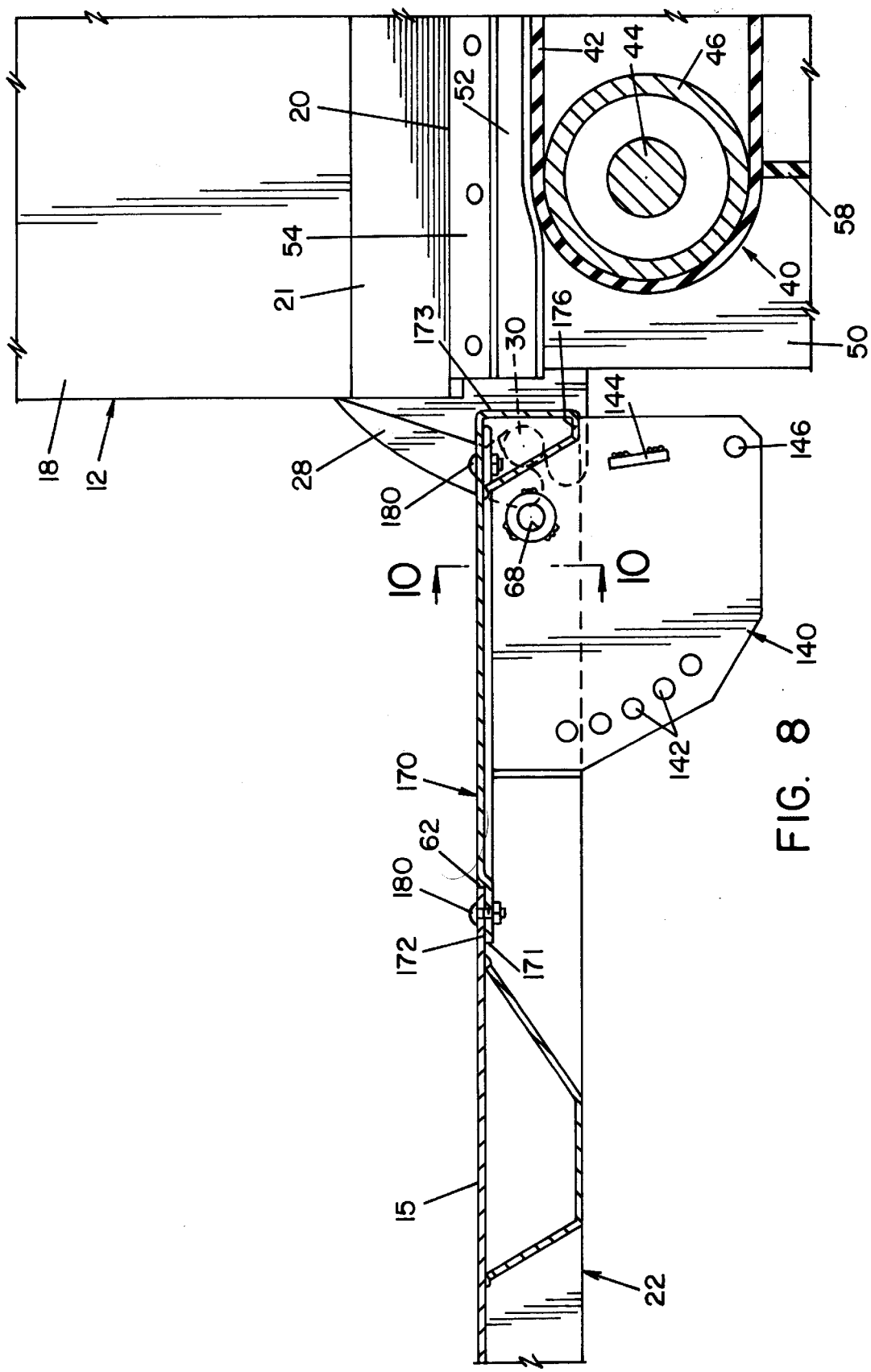
FIG. 8 is a cross-sectional view of the tailgate in an open mode position and illustrates another embodiment of the invention.
Figure 9:
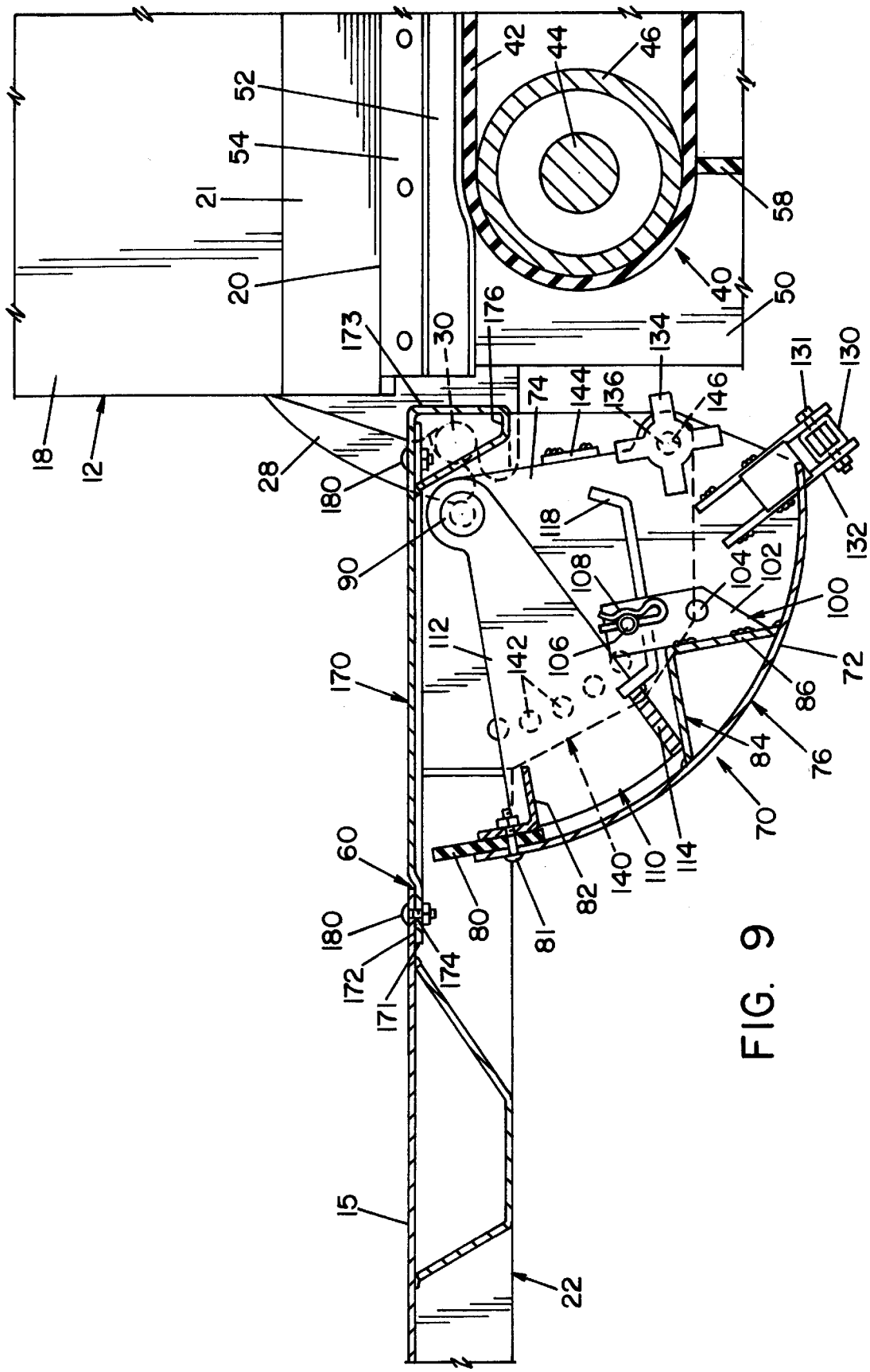
FIG. 9 is a cross-sectional view of the tailgate in an open mode position and illustrates another embodiment of the present invention.
Figure 12:
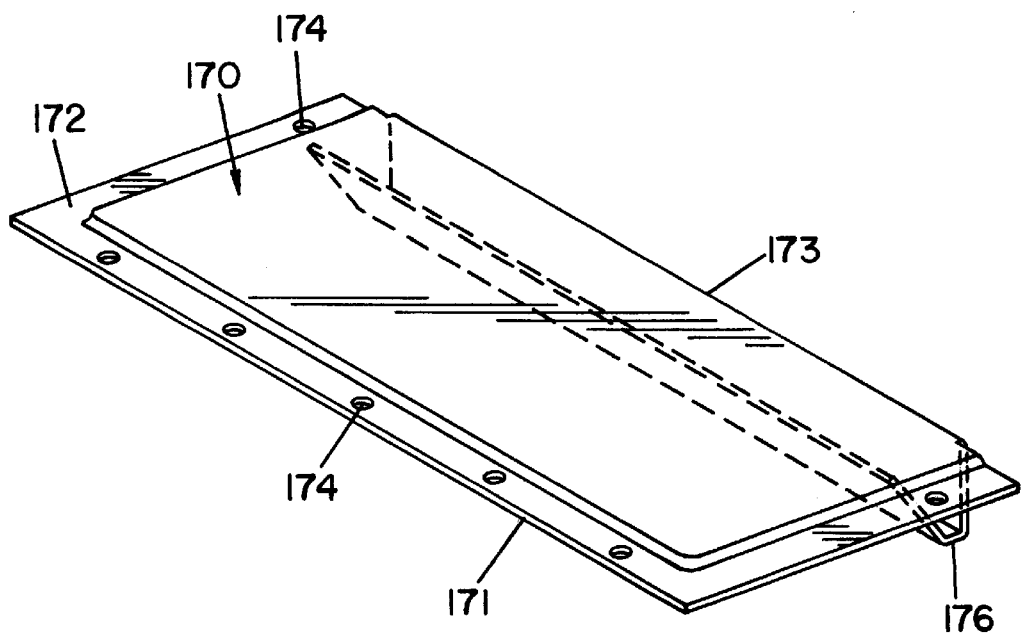
FIG. 12 is a plane view of the plate section illustrated in FIG. 8.

Referring now to FIG. 9, which illustrates another embodiment of the present invention, an opening plate 170 is positioned on tailgate 22 to cover tailgate opening 60. In this embodiment, rotatable feedgate 70 is moved to the completely open position and feedgate lock pin 134 is connected into open lock hole 146 to secure rotatable feedgate 70 in the completely open position. Once rotatable feedgate 70 is secured into the completely open position, opening plate 170 is positioned into tailgate opening 60 such that the bottom end 173 of opening plate 170 is aligned with the bottom of the tailgate. As best shown in FIG. 12, opening plate 170 includes a plate flange 172 which is slightly recessed from the top surface of opening plate 170. Plate flange 172 extends around three sides of opening plate 170. Bottom end 173 of open plate 170 preferably does not include a plate flange 172 but includes a reinforcing flange 176 which provides structural support to opening plate 170. One or more flange holes 174 are located on plate flange 172 such that a bolt and nut assembly 180 can be used to connect opening plate 170 into tailgate opening 60. As illustrated in FIG. 9, the slight recess of plate flange 172 from the top surface of opening plate 170 provides for the top surface of opening plate 170 to become essentially flush with the inner surface 15 of tailgate 22. In this embodiment, the re-positioning of rotatable feedgate 70 to another axis of rotation is not required since opening plate 170 provides for the sealing of tailgate opening 60. As a result, the modification of lock flange 140 to include an upper re-positioning hole 148 and lower re-position hole 150 are not required. Furthermore, the need for a re-position flange 160 is also not required. The lock flange design 140 of the prior co-pending application can be used as disclosed in FIG. 9. However, it can be appreciated that the modified lock flange 140 and the mounting of re-positioned flange 160 may be incorporated onto the tailgate to provide two separate methods for sealing tailgate opening 60. Once the need for opening plate 170 has ended, opening plate 170 is simply removed from tailgate opening 60 by disassembling bolt and nut assembly 180 from opening plate 170. Once opening plate 170 has been removed, rotatable feedgate 70 may then be rotatably positioned in the tailgate opening 60 to provide for the desired flow rate of material from dump body 12. If the dump body is to be used in an open mode of operation for an extended period of time, rotatable feedgate 70 may be removed from the tailgate as shown in FIG. 8. When it is desired to begin the closed mode of operation for controlled dispensing of materials, opening plate 170 is removed from tailgate opening 60 and rotatable feedgate 70 is remounted onto tailgate 22 to control the flow rate of materials from dump body 12.

Referring now to FIGS. 10–13, several mounting designs for the mounting of opening plate 170 may be incorporated into tailgate 22. Two mounting designs are disclosed in FIGS. 10 and 11. In FIG. 10, three sides of the opening plate 170 are mounted into the tailgate opening by bolt and nut assembly 180. The top end 171 of opening plate 170 is bolted into the same bolt holes which were used to mount seal guard 123 and cap seal 120 to the top of opening 60. Prior to mounting opening plate 170 in tailgate opening 60, seal guard 123 and cap seal 120 are removed from the top of the tailgate opening. The holes in the top of the tailgate opening are then used to mount the top end of opening plate 170 into the top of opening 60. One or more flange holes 174 are provided on the two side ends of opening plate 170 and are designed to secure the sides of opening plate 170 to the sides of tailgate opening 60. An alternative mounting design is disclosed in FIG. 11 wherein a flange support 190 is mounted in the tailgate opening so as to support the two sides of opening plate 170 between flange support 190 and inner surface 15. The use of flange support 190 eliminates the need for one or more flange holes 174 on the side flanges of opening plate 170 since the flange support provides for the side support of opening plate 170. However, it can be appreciated that the side flanges can still be mounted by a bolt and nut arrangement to the sides of opening 60.

Figure 13:
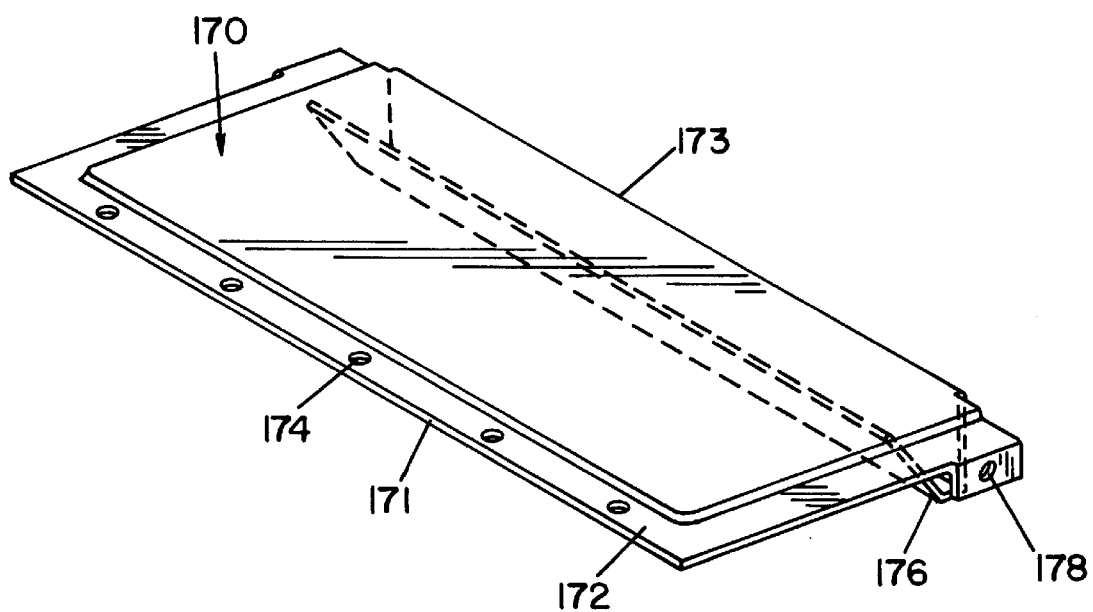
FIG. 13 is a perspective view of a modification of the plate section illustrated in FIG. 12.

FIG. 13 illustrates an alternative opening plate design wherein a side flange hole 178 is incorporated on the side bottom end of opening plate 170. Side flange hole 178 provides for a shear connection for the side of the opening plate 170 to the sides of the tailgate opening 160 rather than a tension connection as provided by the opening plate design disclosed in FIG. 12. In some applications, a shear connection can provide a stronger and more durable connection for the opening plate to the tailgate opening.

The invention has been described with reference to a preferred embodiment and alternates thereof It is believed that many modifications and alterations of the embodiments disclosed will readily suggest themselves to those skilled in the art upon reading and understanding the detailed description of the invention. It is intended to include all such modifications and alterations insofar as they come within the scope of the present invention.

I claim:

1. In a truck having a body which forms a receptacle for holding materials, said body having a base defining a bottom plane of said body, a rear end, a front end and two side walls, said rear end including a rear aperture, the improvement comprising of feedgate means, said feedgate means including a feedgate and a feedgate moving arrangement, said feedgate moving arrangement adapted to move said feedgate, said feedgate positioned at least closely adjacent to said rear aperture to control the size of a passageway through said rear aperture and a mounting flange, said feedgate including two side plates and a face plate connected between said two side plates, said mounting flange connected to said feedgate side plates to rotatable support said feedgate in said rear aperture, said mounting flange including means for mounting said feedgate in a first mounting axis for rotation about a substantially fixed axis, said first mounting axis positioned at least closely adjacent to said rear aperture, said means for mounting including a a second mounting axis for said feedgate, said second mounting axis spaced from said first mounting axis.

2. A truck as defined in claim 1, wherein one of said mounting axis being rearwardly positioned from said rear aperture and generally lies within said bottom plane of said body.

3. A truck as defined in claim 2, wherein another of said mounting axis being rearwardly positioned from said rear aperture and lying in a plane above said bottom plane of said body.

4. A truck as defined in claim 3, wherein said rear aperture has a height, said face plate generally semi-circular shaped and having a radius generally less than said height of said rear aperture.

5. A truck as defined in claim 4, wherein said feedgate including side guide means for cooperating with said face plate and side plates of said feedgate in controlling the flow of material through the sides of said rear aperture.

6. A truck as defined in claim 5, including a conveyor in said body for conveying said materials in said body to said rear aperture.

7. A truck as defined in claim 6, wherein said mounting flange including an arrangement for securing said feedgate in at least one position between a closed position and an open position.

8. A truck as defined in claim 7, wherein said rear end including a tailgate, said tailgate including said rear aperture, said tailgate including mounting means for pivotally connecting said tailgate to said side walls.

9. A truck as defined in claim 8, wherein said mounting means including a mounting axis to mount said feedgate in said aperture such that a face plate of said feedgate being generally aligned with the inner surface of said tailgate.

10. A truck as defined in claim 3, wherein said feedgate including side guide means for cooperating with said face plate and side plates of said feedgate in controlling the flow of material through the sides of said rear aperture.

11. A truck as defined in claim 3, wherein said mounting flange including an arrangement for securing said feedgate in at least one position between a closed position and an open position.

12. A truck as defined in claim 3, wherein said rear end including a tailgate, said tailgate including said rear aperture, said tailgate including mounting means for pivotally connecting said tailgate to said side walls.

13. A truck as defined in claim 1, wherein one of said mounting axis being rearwardly positioned from said rear aperture and lying in a plane above said bottom plane of said body.

14. A truck as defined in claim 1, wherein said feedgate including a curvilinear face plate.

15. A truck as defined in claim 1, wherein said rear aperture has a height, said face plate generally semi-circular shaped and having a radius generally less than said height of said rear aperture.

16. A truck as defined in claim 1, wherein said feedgate including side guide means for cooperating with said face plate and side plates of said feedgate in controlling the flow of material through the sides of said rear aperture.

17. A truck as defined in claim 1, including a conveyor in said body for conveying said materials in said body to said rear aperture.

18. A truck as defined in claim 1, wherein said mounting flange including an arrangement for securing said feedgate in at least one position between a closed position and an open position.

19. A truck as defined in claim 1, wherein said rear end including a tailgate, said tailgate including said rear aperture, said tailgate including mounting means for pivotally connecting said tailgate to said side walls.

20. A truck as defined in claim 19, wherein said mounting means including a mounting axis to mount said feedgate in said aperture such that a face plate of said feedgate being generally aligned with the inner surface of said tailgate.

* * * * *